United States Patent
Hawkins et al.

(10) Patent No.: US 10,730,603 B2
(45) Date of Patent: Aug. 4, 2020

(54) SPACE EFFICIENT LAVATORY MODULE FOR COMMERCIAL AIRCRAFT

(71) Applicant: B/E Aerospace, Inc., Wellington, FL (US)

(72) Inventors: Aaron Hawkins, Mercer Island, WA (US); Robert K. Brauer, Seattle, WA (US); Ed Kinnier, III, Winston-Salem, NC (US); Christopher I. Pirie, Mukilteo, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 15/479,677

(22) Filed: Apr. 5, 2017

(65) Prior Publication Data

US 2017/0203844 A1    Jul. 20, 2017

Related U.S. Application Data

(60) Continuation of application No. 14/717,945, filed on May 20, 2015, now Pat. No. 9,630,719, which is a
(Continued)

(51) Int. Cl.
*B64C 1/10* (2006.01)
*B64D 11/02* (2006.01)
(Continued)

(52) U.S. Cl.
CPC .............. *B64C 1/10* (2013.01); *B64D 11/02* (2013.01); *B64D 11/06* (2013.01); *B64D 11/064* (2014.12); *B64F 5/00* (2013.01); *Y02T 50/46* (2013.01)

(58) Field of Classification Search
CPC ............ B64D 11/00; B64D 2011/0046; B64D 11/0023; B64D 11/06; B64D 2011/0617;
(Continued)

(56) References Cited

U.S. PATENT DOCUMENTS 2,650,368 A * 9/1953 Evans .................... B64D 11/02
312/304
2,760,443 A * 8/1956 Gobrecht ............... B61D 31/00
105/315
(Continued)

FOREIGN PATENT DOCUMENTS

CN      1867485       11/2006
CN    101218149        7/2008
(Continued)

OTHER PUBLICATIONS

Second Board Opinion on Chinese Application No. 201380037324.6 dated Jan. 24, 2019. 9 pages.
(Continued)

*Primary Examiner* — Benjamin P Lee
(74) *Attorney, Agent, or Firm* — Donna P. Suchy

(57) ABSTRACT

A space efficient lavatory module for commercial aircraft includes an aft facing concave wall recess that provides a greater distance from an upper, forward facing portion of a cabin structure, such as an aircraft passenger seat to avoid having a passenger's head impact the aft facing lavatory or enclosure wall in a sudden aircraft deceleration. The aft facing concave wall recess also provides space for mounting of a protective cushion, in order to reduce a passenger's risk of head trauma in a sudden deceleration, as well as other items, such as a video monitor, a bassinet or infant bed, without inhibiting passenger movement.

19 Claims, 3 Drawing Sheets

Related U.S. Application Data division of application No. 13/551,397, filed on Jul. 17, 2012, now Pat. No. 9,038,946, which is a continuation-in-part of application No. 13/089,063, filed on Apr. 18, 2011, now Pat. No. 8,590,838.

(60) Provisional application No. 61/346,835, filed on May 20, 2010, provisional application No. 61/326,198, filed on Apr. 20, 2010.

(51) Int. Cl.
*B64D 11/06* (2006.01)
*B64F 5/00* (2017.01)

(58) Field of Classification Search
CPC . B64D 2011/0665; B63B 11/00; B63B 11/02; B63B 29/00; B63B 29/02
See application file for complete search history.

(56) References Cited

U.S. PATENT DOCUMENTS

| | | | |
|---|---|---|---|
| 2,914,001 A * | 11/1959 | Murphy | B61D 1/04 105/315 |
| 3,738,497 A | 6/1973 | Betts et al. | |
| 4,055,317 A * | 10/1977 | Greiss | B64D 11/00 244/118.5 |
| 4,884,767 A | 12/1989 | Shibata | |
| 5,150,863 A * | 9/1992 | Hozumi | B64D 11/00 244/118.5 |
| 5,333,416 A * | 8/1994 | Harris | B64D 11/0015 312/7.2 |
| 5,340,059 A * | 8/1994 | Kanigowski | B64D 25/00 244/118.5 |
| 5,482,230 A * | 1/1996 | Bird | B64C 1/10 244/118.5 |
| 5,529,265 A * | 6/1996 | Sakurai | A47C 7/72 244/118.5 |
| 5,577,358 A * | 11/1996 | Franke | B64D 11/0023 244/118.5 |
| 5,611,503 A | 3/1997 | Brauer | |
| 5,716,026 A * | 2/1998 | Pascasio | B64D 11/00 105/315 |
| 6,000,659 A | 12/1999 | Brauer | |
| 6,007,025 A | 12/1999 | Coughren et al. | |
| 6,079,669 A * | 6/2000 | Hanay | B64D 11/0691 244/118.5 |
| 6,237,872 B1 * | 5/2001 | Bar-Levav | B64D 11/0601 105/314 |
| 6,520,451 B1 | 2/2003 | Moore | |
| 6,615,421 B2 * | 9/2003 | Itakura | B64D 11/02 244/118.5 |
| 6,742,840 B2 | 6/2004 | Bentley | |
| 6,822,812 B1 | 11/2004 | Brauer | |
| 6,874,731 B1 | 4/2005 | Brauer et al. | |
| 6,889,936 B1 * | 5/2005 | Pho | B64D 11/02 105/315 |
| D508,173 S | 8/2005 | Guard et al. | |
| D516,496 S | 3/2006 | Guard et al. | |
| D533,129 S | 12/2006 | Guard et al. | |
| 7,156,345 B2 | 1/2007 | Brauer et al. | |
| 7,222,820 B2 * | 5/2007 | Wentland | B64D 11/02 244/118.5 |
| 7,252,267 B2 | 8/2007 | Young et al. | |
| 7,284,287 B2 | 10/2007 | Cooper et al. | |
| 7,331,545 B2 | 2/2008 | Young et al. | |
| 7,448,574 B2 | 11/2008 | Young et al. | |
| 7,448,575 B2 * | 11/2008 | Cheung | B64D 11/00 105/345 |
| 7,469,860 B2 | 12/2008 | Young et al. | |
| 7,516,919 B2 | 4/2009 | Young et al. | |
| D606,923 S | 12/2009 | Young et al. | |
| D617,254 S | 6/2010 | Guard et al. | |
| 7,871,039 B2 | 1/2011 | Fullerton et al. | |
| 7,934,679 B2 * | 5/2011 | Bock | B64D 11/00 244/118.6 |
| 8,087,613 B2 | 1/2012 | Fullerton et al. | |
| 8,096,502 B2 * | 1/2012 | Bock | B64D 11/00 244/118.6 |
| 8,109,469 B2 * | 2/2012 | Breuer | B64D 11/02 244/118.5 |
| 8,162,258 B2 * | 4/2012 | Joannis | B64D 11/00 244/118.1 |
| 8,167,244 B2 * | 5/2012 | Johnson | B64D 11/0023 105/344 |
| 8,177,163 B2 * | 5/2012 | Wilcynski | B60N 2/14 244/118.5 |
| 8,590,838 B2 | 11/2013 | Cook et al. | |
| D705,909 S | 5/2014 | Koyama et al. | |
| 8,991,947 B2 * | 3/2015 | Lee | B64D 47/00 312/242 |
| 9,321,534 B2 | 4/2016 | Grieve et al. | |
| 9,327,836 B2 | 5/2016 | Weitzel et al. | |
| 9,359,077 B2 * | 6/2016 | Koyama | B64D 11/02 |
| 9,382,006 B2 | 7/2016 | Koyama | |
| 9,428,274 B2 | 8/2016 | Moje et al. | |
| 9,457,903 B2 | 10/2016 | Moje et al. | |
| 9,862,490 B2 | 1/2018 | Schliwa et al. | |
| 9,862,491 B2 | 1/2018 | McKee et al. | |
| 9,908,623 B2 | 3/2018 | Hashberger et al. | |
| 10,023,314 B2 | 7/2018 | Savian | |
| 2003/0193220 A1 | 10/2003 | Jensen | |
| 2005/0082430 A1 | 4/2005 | Young et al. | |
| 2006/0065783 A1 * | 3/2006 | Mills | B64D 11/00 244/118.6 |
| 2006/0192050 A1 * | 8/2006 | Cheung | B64D 11/00 244/118.6 |
| 2007/0164157 A1 * | 7/2007 | Park | B60N 2/34 244/118.6 |
| 2007/0170310 A1 * | 7/2007 | Bock | B64D 11/00 244/118.5 |
| 2007/0241232 A1 * | 10/2007 | Thompson | B64D 11/02 244/118.6 |
| 2007/0295863 A1 * | 12/2007 | Thompson | B60N 2/01 244/118.6 |
| 2009/0050738 A1 | 2/2009 | Breuer et al. | |
| 2009/0050783 A1 | 2/2009 | Roberts | |
| 2009/0065642 A1 * | 3/2009 | Cheung | B64D 11/00 244/118.6 |
| 2009/0146004 A1 | 6/2009 | Plant | |
| 2009/0200422 A1 * | 8/2009 | Johnson | B64D 11/0023 244/118.5 |
| 2009/0255437 A1 * | 10/2009 | Hachet | B61D 1/00 105/344 |
| 2010/0059625 A1 | 3/2010 | Saint-Jalmes et al. | |
| 2010/0181425 A1 | 7/2010 | Guering et al. | |
| 2011/0121134 A1 * | 5/2011 | Schotte | B64D 11/00 244/118.5 |
| 2011/0139930 A1 * | 6/2011 | Sutthoff | B64D 11/02 244/118.5 |
| 2011/0210205 A1 * | 9/2011 | Bock | B64D 11/00 244/118.6 |
| 2011/0253835 A1 | 10/2011 | Cook et al. | |
| 2012/0025018 A1 | 2/2012 | France et al. | |
| 2012/0112505 A1 * | 5/2012 | Breuer | B64D 11/0023 297/217.1 |
| 2012/0253752 A1 | 10/2012 | Brauer | |
| 2012/0273614 A1 * | 11/2012 | Ehlers | B64D 11/02 244/118.5 |
| 2012/0325964 A1 * | 12/2012 | Hawkins | B64D 11/02 244/118.6 |
| 2013/0206906 A1 * | 8/2013 | Burrows | B64D 11/0691 244/118.5 |
| 2013/0320139 A1 * | 12/2013 | Cho | B64D 11/06 244/118.6 |
| 2014/0014774 A1 * | 1/2014 | Pozzi | B64D 11/06 244/118.6 |
| 2014/0027572 A1 * | 1/2014 | Ehlers | B64D 11/06 244/118.6 |
| 2014/0027574 A1 | 1/2014 | Obadia et al. | |
| 2014/0196206 A1 | 7/2014 | Savian et al. | |

(56) References Cited

U.S. PATENT DOCUMENTS

| | | |
|---|---|---|
| 2015/0239563 A1 | 8/2015 | Cook et al. |
| 2015/0251760 A1 | 9/2015 | Hawkins et al. |
| 2015/0363656 A1 | 12/2015 | Brauer |

FOREIGN PATENT DOCUMENTS

| | | |
|---|---|---|
| CN | 101351384 | 1/2009 |
| CN | 101588966 | 11/2009 |
| CN | 101765541 | 6/2010 |
| DE | 694 22 723 T2 | 6/2000 |
| DE | 697 25 542 T2 | 4/2004 |
| DE | 102007009863 A1 | 9/2008 |
| EP | 0 722 404 A1 | 4/1995 |
| EP | 0 850 834 A1 | 7/1998 |
| EP | 1 281 614 A1 | 2/2003 |
| EP | 1 685 023 | 6/2008 |
| JP | H05246355 A | 9/1993 |
| JP | 2007523002 A | 8/2007 |
| JP | 2009513419 A | 4/2009 |
| WO | WO 03/026495 A2 | 4/2003 |
| WO | WO 2005/014395 A1 | 2/2005 |
| WO | WO 2005/080196 A1 | 9/2005 |
| WO | WO 2007/006938 A1 | 1/2007 |
| WO | WO 2007/013164 A1 | 2/2007 |
| WO | WO 2009/073244 A1 | 6/2009 |
| WO | WO 2014/024046 A2 | 2/2014 |

OTHER PUBLICATIONS

Notice of Supplemental Authority in *B/E Aerospace, Inc.* v. *C&D Zodiac, Inc.*, Nos. 2019-1935, 2019-1936, dated Feb. 10, 2020, 3 pages.
Petition for Post Grant Review of Design U.S. Pat. No. D. 764,031 filed Apr. 10, 2017 and assigned PGR No. PGR2017-00019.
Petition for Inter Partes Review of U.S. Pat. No. 9,365,292 filed Apr. 13, 2017 and assigned IPR No. IPR2017-01274.
Petition for Inter Partes Review of U.S. Pat. No. 9,073,641 filed Apr. 13, 2017 and assigned IPR No. IPR2017-01275.
Petition for Inter Partes Review of U.S. Pat. No. 9,440,742 filed Apr. 13, 2017 and assigned IPR No. IPR2017-01276.
Final Written Decision in IPR2014-00727 under 35 U.S.C. § 318; 37 C.F.R. § 42.73.
Declaration of Alan Anderson Under 37 C.F.R. § 1.68.
Rendering of the KLM Crew Rest.
Declaration of Paul Sobotta executed Apr. 2, 2015 and submitted in IPR2014-00727.
Image of B/E Aerospace "Spacewall," available at <http://beaerospace.com/products/structures-and-integration/737-advanced-lavatory/>.
Unopposed Motion to Withdraw Motion for Preliminary Injunction in *B/E Aerospace, Inc.* v. *Zodiac Aerospace, et al.*, No. 2:14-cv-210, Dkt. 47 (E.D. Tex. Jun. 6, 2014).
Voluntary Dismissal in *B/E Aerospace, Inc.* v. *Zodiac Aerospace, et al.*, No. 2:14-cv-210, Dkt. 50 (E.D. Tex. Jun. 19, 2014).
Patent Owner's Opening Brief in Federal Circuit Appeal Nos. 16-1496, 16-1497.
Declaration of Scott Savian, dated Mar. 20, 2017, including Exhibits A-E thereto.
Declaration of Vince Huard, dated Mar. 10, 2017, including Exhibits A-I thereto.
McDonnell Douglas DC-10 Customer Configuration Summary (a/k/a Orange Book), revised Oct. 1978 (the "Orange Book").
Declaration of Ronald Kemnitzer executed Apr. 10, 2017 and submitted in PGR2017-00019.
B/E Aerospace Press Release regarding Investor Day Webcast dated Mar. 12, 2012.
Letters from Petitioner, C&D Zodiac, Inc. to Patent Owner, B/E Aerospace, Inc. regarding Prior Art.
B/E Aerospace Investor Day Presentation dated Mar. 12, 2012.
"New aircraft lay sees B/E Aerospace flushed with success," Apex Editor's Blog Article dated Apr. 19, 2013.
SEC Exhibit 99.1—B/E Aerospace News Release—"B/E Aerospace Wins Exclusive Boeing Award; Program Estimated Value in Excess of $800 Million."
B/E Aerospace's Complaint for Patent Infringement in *B/E Aerospace, Inc.* v. *Zodiac Aerospace, Inc. et al.*, No. 2:14-cv-01417 (E.D. Tex., Dec. 15, 2016).
Declaration of R. Klaus Brauer, submitted during prosecution of U.S. Appl. No. 14/709,378.
Declaration of Mitchell Freeman, submitted during prosecution of U.S. Appl. No. 14/709,378.
Screen capture from website of Tony Bravetti, available at <http://www.tonybravetti.com/my-work-edited>.
B/E Aerospace News Release—"Boeing Delivers First of 100 Next-Generation 737s to Delta Air Lines Configured with Numerous B/E Aerospace Systems and Products."
B/E Aerospace, Inc.'s Opening Brief in case No. IPR2017-01275 and No. IPR2017-01276 dated Sep. 6, 2019. 218 pages.
B/E Aerospace, Inc's Reply Brief in case No. IPR2017-01275 & IPR2017-01276 dated Nov. 6, 2019. 22 pages.
C&D Zodiac, Inc's Reply Brief in case No. IPR2017-01275 & IPR2017-01276 dated Oct. 16, 2019. 44 pages.
Examination Report on Australian Application No. 2017221822 dated Nov. 12, 2018. 2 pages.
Office Action on EP Application No. 18202015.6 dated Jul. 8, 2019. 6 pages.
Patent Reexamination Board Decision on CN Application No. 201380037324.6 dated May 30, 2019. 17 pages.
Search Report on EP Application No. 18202015.6 dated Jun. 18, 2019. 4 pages.
Chinese Search Report, dated Aug. 5, 2014, 1 pages, from Chinese application No. 2011800202050.
Final Written Decision in IPR 2017-01276 under 35 U.S.C. 318; 37 U.S.C. 42 entered Sep. 28, 2018. 51 pages.
Office Action on Japanese Patent Application No. 2015-523145 dated Jun. 5, 2017. 6 pages.
R. Klaus Brauer, Affidavit Submitted in Related Case U.S. Appl. No. 14/709,378, signed Mar. 31, 2016, pp. 1-19.
Office Action on Japanese Patent Application No. 2015-523145 dated Nov. 29, 2017. 4 pages.
Office Action on Canadian Patent Application No. 2879022 dated Jul. 12, 2017. 3 pages.
Office Action on Canadian Patent Application No. 2879022 dated Apr. 16, 2018. 3 pages.
Office Action on European Patent Application No. 13819463 dated Dec. 12, 2017. 4 pages.
Office Action on Canadian Patent Application No. 2796589 dated Jan. 11, 2017. 4 pages.
Decision Denying Institution of Inter Partes Review in case IPR2017-01274 dated Oct. 31, 2017. 14 pages.
Request for reconsideration of decision denying institution of inter partes review in case IPR2017-01274 dated Nov. 29, 2017. 15 pages.
Decision pursuant to 37 C.F.R. 42.71(d) in case IPR2017-01274 dated Mar. 9, 2018. 7 pages.
C&D Zodiac, Inc's Notice of Appeal in case IPR2017-01274 dated Mar. 19, 2018. 28 pages.
Decision Denying Institution of Inter Partes Review in case IPR2017-01273 dated Oct. 31, 2017. 11 pages.
Request for Reconsideration of Decision Denying Institution of Inter Partes Review in case IPR2017-01273 dated Nov. 29, 2017. 15 pages.
Decision pursuant to 37 C.F.R. 42.71(d) in case IPR2017-01273 dated Mar. 8, 2018. 6 pages.
C&D Zodiac, Inc's Notice of Appeal in case IPR2017-01273 dated Mar. 19, 2018. 24 pages.
Decision Instituting Inter Partes Review in case IPR2017-01275 dated Oct. 31, 2017. 24 pages.
B/E Aerospace, Inc.'s Response in case IPR2017-01275 dated Jan. 31, 2018. 52 pages.
C&D Zodiac, Inc's Reply in case IPR2017-01275 dated May 1, 2018. 35 pages.
Judgment Inter Partes Review in cases IPR2017-01275 and IPR2017-01276 dated Jul. 5, 2018. 4 pages.

(56) References Cited

OTHER PUBLICATIONS

B/E Aerospace, Inc.'s Response in case PGR2017-00019 dated Jan. 31, 2018. 48 pages.
C&D Zodiac, Inc.'s Reply in case PGR2017-00019 dated May 1, 2018. 32 pages.
Decision in Institution of Post-Grant Review in case PGR2017-00019 dated Oct. 31, 2017. 27 pages.
Decision in Institution of Inter Partes Review in case IPR2017-01276 dated Oct. 31, 2017. 28 pages.
B/E Aerospace, Inc.'s Response in case IPR2017-01276 dated Jan. 31, 2018. 61 pages.
C&D Zodiac, Inc.'s Reply in case IPR2017-01276 dated May 1, 2018. 35 pages.
Final Written Decision in case IPR2017-01276 dated Sep. 28, 2018. 51 pages.
Request for rehearing following final written decision in case IPR2017-01276 dated Oct. 12, 2018. 18 pages.
Order on petition for rehearing En Banc in case IPR2014-00727 dated Dec. 7, 2017. 2 pages.
Petition for rehearing En Banc in case IPR2014-00727 dated Nov. 11, 2017. 46 pages.
Office Action on Australian Patent Application No. 2011242901 dated Aug. 25, 2015. 3 pages.
Office Action on Australian Patent Application No. 2016219635 dated Aug. 31, 2016. 3 pages.
Search on Chinese Patent Application No. 201180020205.0 dated Jul. 28, 2014. 1 page.
First Office Action on Chinese Patent Application No. 201180020205.0 dated Aug. 5, 2014. 17 pages.
Search on Chinese Patent Application No. 201380037324.6 dated Nov. 3, 2015. 2 pages.
First Office Action on Chinese Patent Application No. 201380037324.6 dated Nov. 16, 2015. 15 pages.
Second Office Action on Chinese Patent Application No. 201380037324.6 dated Jul. 13, 2016. 16 pages.
Office Action on Japanese Patent Application No. 2013-506240 dated Oct. 1, 2013. 4 pages.
Office Action on Japanese Patent Application No. 2013-506240 dated Jun. 24, 2014. 4 pages.
Office Action on Japanese Patent Application No. 2013-506240 dated Feb. 24, 2015. 4 pages.
Office Action on Japanese Patent Application No. 2015-523145 dated Mar. 1, 2016. 6 pages.
Office Action on Japanese Patent Application No. 2015-523145 dated Oct. 18, 2016. 6 pages.
EPO, International Search Report and Written Opinion for PCT international Application No. PCT/US2011/033090 dated Sep. 15, 2011.
International Search Report, dated Jan. 27, 2015, 5 pages, from PCT/US2013/050342 published as WO 2014/014780 on Jan. 23, 2014.
C&D Zodiac, Inc.'s proposal to Scandinavian Airlines System to manufacture S4 Storage Unit, Aug. 23, 2001, 17 pages.
C&D Zodiac, Inc.'s drawings with a leading page entitled "MD90," 27 pages.
Photographs of C&D Zodiac, Inc.'s S4 storage unit, 5 pages.
C&D Zodiac, Inc.'s Petition for Inter Partes Review of U.S. Pat. No. 8,590,838 (including exhibits/tabs 1-9), May 2, 2014, 856 pages.
Technical Proposal by FSI to Air France regarding a Door 4 overhead crew rest station for the Boeing 747, Aug. 3, 1994, 10 pages.
Rendering and photographs of Boeing 747 overhead crew rest station, 3 pages.
B/E Aerospace, Inc. Motion for Preliminary Injunction, May 16, 2014, 25 pages.
Greg Chamitoff Declaration in support of B/E Aerospace, Inc.'s Motion for Preliminary Injunction, May 14, 2014, 39 pages.
Slide Deck, B/E Aerospace, Spacewall Technology, Examiner Interview, dated Feb. 24, 2016, 53 pages.
Startup Boeing, Dc-10 presentation, copyright 2007. 27 pages.
Flight Structures, Inc., 747 Door 4 Overhead Crew Rest rendering. 1 page.
R. Klaus Brauer, Affidavit Submitted in Related Case U.S. Appl. No. 14/709,409, signed Mar. 28, 2016, pp. 1-19.
Office Action on European Patent Application No. 11717127 dated Mar. 16, 2017. 5 pages.

\* cited by examiner

SPACE EFFICIENT LAVATORY MODULE FOR COMMERCIAL AIRCRAFT

CROSS-REFERENCES TO RELATED APPLICATIONS

This application is a continuation of U.S. application Ser. No. 14/717,945 filed May 20, 2015 which is a divisional of application Ser. No. 13/551,397, filed Jul. 17, 2012 (now U.S. Pat. No. 9,038,946, issued May 26, 2015), which is a continuation-in-part of application Ser. No. 13/089,063, filed Apr. 18, 2011 (now U.S. Pat. No. 8,590,838, issued Nov. 26, 2013), which is based upon and claims priority from Provisional Application No. 61/326,198, filed Apr. 20, 2010, and Provisional Application No. 61/346,835, filed May 20, 2010. All above identified applications are hereby incorporated by reference in their entireties.

BACKGROUND OF THE INVENTION

The present invention relates generally to aircraft enclosures, and more particularly relates to an aircraft cabin enclosure, such as a lavatory, an aircraft closet, or an aircraft galley, for example, including an aircraft cabin structure having an aft portion that can rapidly move in a forward direction towards an adjacent aft facing wall of an enclosure or lavatory in a sudden aircraft deceleration.

Aircraft lavatories, closets and other full height enclosures commonly have forward walls that are flat in a vertical plane. Structures such as passenger seats installed forward of such aircraft lavatories, closets and similar full height enclosures often have shapes that are contoured in the vertical plane. The juxtaposition of these flat walled enclosures and contoured structures renders significant volumes unusable to both the function of the flat walled lavatory or enclosure and the function of the contoured seat or other structure. Additionally, due to the lack of a provision for structural load sharing, conventional aircraft lavatories require a gap between the lavatory enclosures and adjacent structures, resulting in a further inefficiency in the use of space.

Aircraft bulkheads, typically separating passenger cabin areas or classes of passenger service, are in common use, and typically have a contour permitting passengers seated behind the bulkhead to extend their feet modestly under the premium seats immediately forward of the bulkhead. These provide a comfort advantage to passengers seated behind the bulkhead, but provide no increased efficiency in the use of space, in that they do not enable the seats fore and aft of the bulkhead to be placed more closely together. Short, floor-mounted stowage boxes, typically no taller than the bottom cushion of a passenger seat, are often positioned between the flat wall of current lavatories or other enclosures and passenger seats. These provide no improvement to the utility or spatial efficiency of the lavatory or other enclosure. While they do provide some useful stowage for miscellaneous items, they do not provide sufficient additional stowage to provide more space for passenger seating.

It would be desirable to provide an aircraft lavatory or other enclosure that can reduce or eliminate the gaps and volumes of space previously required between lavatory enclosures and adjacent aircraft cabin structures to allow an adjacent aircraft cabin structure such as passenger seating installed forward of the lavatory or other enclosure to be installed further aft, providing more space forward of the lavatory or enclosure for passenger seating or other features than has been possible in the prior art. Alternatively, the present invention can provide a more spacious lavatory or other enclosure with no need to move adjacent seats or other aircraft cabin structures forward.

It would also be desirable to provide an aircraft lavatory or other enclosure with a wall to bear loads from an adjacent passenger seating or other aircraft cabin structure, permitting elimination of a required gap between the lavatory or other enclosure and the adjacent passenger seating or other aircraft cabin structure, making more space available for other uses. In addition, enabling a lavatory or other enclosure to bear loads from an adjacent aircraft cabin structure can reduce the combined weight of the lavatory or other enclosure and the adjacent aircraft cabin structure.

It also would be desirable to provide an aircraft lavatory or other enclosure that can reduce or eliminate the gaps and volumes of space previously required between lavatory enclosures and adjacent aircraft cabin structures, to allow the installation of an increased number of passenger seats, to increase the value of the aircraft.

It also would be desirable to provide an aircraft lavatory or other enclosure that can provide a more efficient use of airplane cabin space and provide for greater passenger comfort by providing an aft facing concave recess in a lavatory or enclosure wall that provides a greater distance from an upper, forward facing portion of a seat back, against which a passenger's head would typically rest, to the aft facing lavatory or enclosure wall than to a flat wall extending in a vertical plane as in the prior art, to make it possible to avoid having a passenger's head impact the aft facing lavatory or enclosure wall in a sudden aircraft deceleration, and allowing the distance required between the seat and the lavatory or enclosure to be made smaller, making space available for other purposes in the airplane.

It also would be desirable to provide a volume in the aft facing concave recess in the lavatory or enclosure wall for a protective cushion, such as an airbag, for example, in order to reduce a passenger's risk of head trauma resulting from the passenger's head contacting the aft facing lavatory or enclosure wall in a sudden deceleration. It also would be desirable for the volume to provide space for a video monitor in the aft facing concave recess in the lavatory or enclosure wall that does not inhibit passenger movement, and for a bassinet or infant bed for use during flight that does not obstruct passenger movement as much as bassinets or infant beds mounted on the flat walls extending in a vertical plane of the prior art. It also would be desirable to provide a cavity or recess at floor level in the aft facing lavatory or enclosure wall to provide a volume for foot clearance for passengers. The present invention meets these and other needs.

SUMMARY OF THE INVENTION

Briefly, and in general terms, the present invention provides for an aircraft enclosure, such as a lavatory, an aircraft closet, or an aircraft galley, for example, that includes an aft facing concave wall recess that provides a greater distance from an upper, forward facing portion of a cabin structure. The cabin structure can be an aircraft passenger seat having an upper, forward facing seat back, and the greater distance between the aft facing concave wall recess avoids having a passenger's head impact the aft facing lavatory or enclosure wall in a sudden aircraft deceleration. The aft facing concave wall recess also provides space for mounting of a protective cushion, in order to reduce a passenger's risk of head trauma in a sudden deceleration, as well as other items, such as a video monitor, a bassinet or infant bed, without inhibiting passenger movement.

Accordingly, in one presently preferred aspect, the present invention provides for an enclosure, such as a lavatory, an aircraft closet, or an aircraft galley, for example, for a cabin of an aircraft including an aircraft enclosure for an aircraft cabin including a cabin structure such as a passenger seat, and having an upper aft portion and an upper, forward facing portion, such as for cushioning a passenger's head. The enclosure unit is mounted immediately forward of the aircraft cabin structure, and includes one or more walls having an aft facing wall portion that is taller than the aircraft cabin structure, and that has a surface defining a concave recess that is spaced apart from the upper, forward facing portion of the aircraft cabin structure.

In a presently preferred aspect, the cabin structure is an aircraft passenger seat that has a seat back movable from an upright position to a reclined position. In another presently preferred aspect, the concave recess includes a protective cushion. In another presently preferred aspect, the concave recess includes a video monitor. In another presently preferred aspect, the concave recess includes a bassinet. In another presently preferred aspect, the concave recess includes an infant bed. In another presently preferred aspect, the aft facing wall portion includes a recess adjacent to a floor of the aircraft cabin configured to provide foot clearance for a passenger.

These and other aspects and advantages of the invention will become apparent from the following detailed description and the accompanying drawings, which illustrate by way of example the features of the invention.

DETAILED DESCRIPTION OF THE PREFERRED EMBODIMENTS

Figure 1:
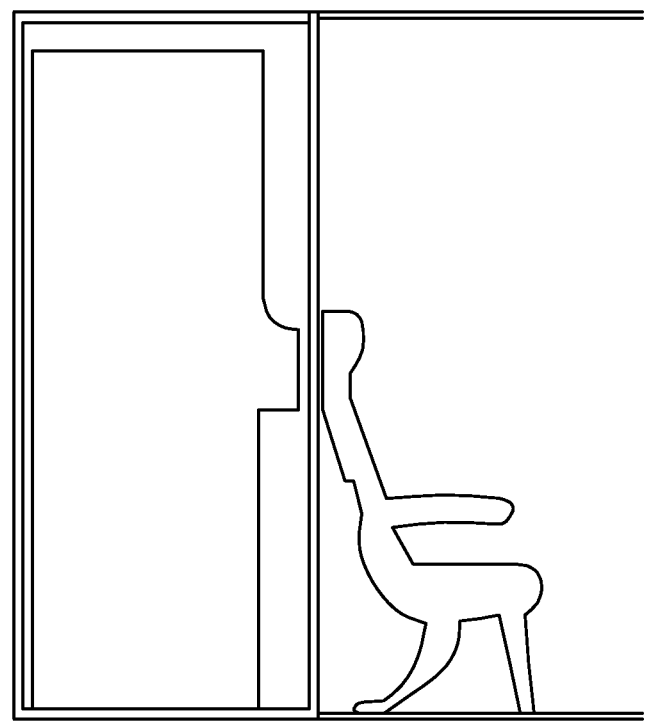
FIG. 1 is a schematic diagram of a prior art installation of a lavatory immediately aft of and adjacent to an aircraft passenger seat.
Figure 2:
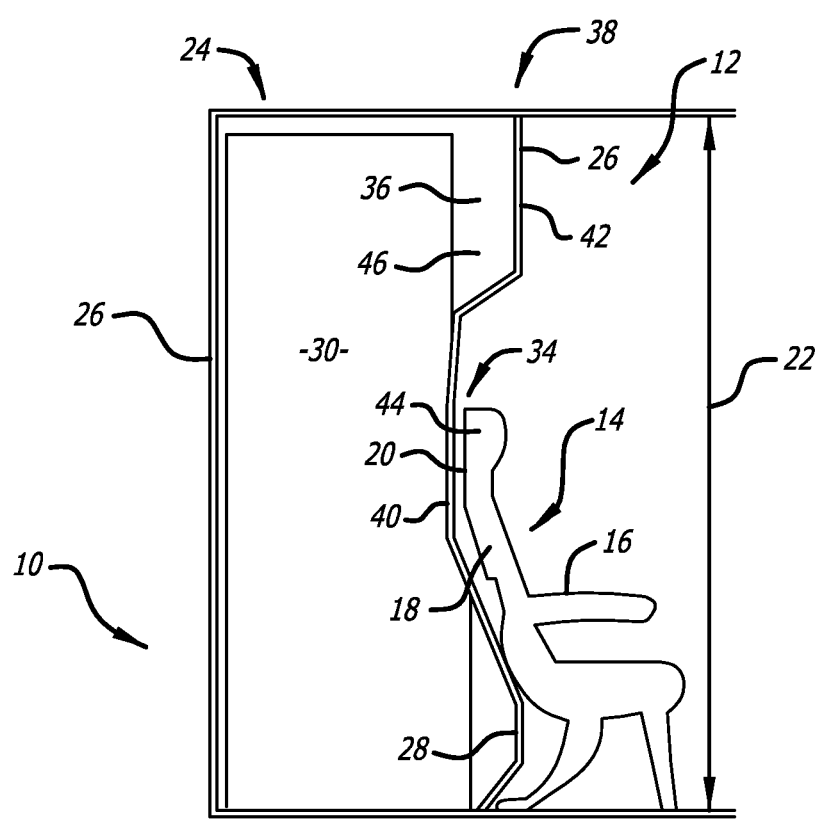
FIG. 2 is a schematic diagram of an installation of a lavatory according to a first embodiment of the present invention immediately aft of and adjacent to or abutting an aircraft cabin passenger seat.

Referring to the drawings, which are provided by way of example, and not by way of limitation, in a first embodiment illustrated in FIG. 2, the present invention provides for an enclosure 10, such as a lavatory for a cabin 12 of an aircraft (not shown), although the enclosure may also be an aircraft closet, or an aircraft galley, or another similar enclosed or structurally defined space, for example. The cabin includes an aircraft cabin structure 14, and the enclosure may be taller than the cabin structure. The cabin structure can include a passenger seat 16, for example, installed immediately forward of the enclosure and having an aft portion 18 with and exterior aft surface 20 that is substantially not flat in a vertical plane 22. The lavatory includes a lavatory stall unit 24, and having one or more walls 26 having a forward facing wall portion 28. The one or more walls define an interior lavatory space 30, and the forward facing wall portion is configured to be disposed immediately aft of and adjacent to or abutting the exterior aft surface of the aircraft cabin structure. The forward facing wall portion has a shape that is substantially not flat in the vertical plane, and preferably is shaped to include a recess 34 such that the forward facing wall portion substantially conforms to the shape of the exterior aft surface of the aircraft cabin structure, and when the aircraft cabin structure is a passenger seat, enabling the adjacent seat back 44 to move from an upright position 35, illustrated in FIG. 3, to a reclined position 37, illustrated in FIG. 4. In a presently preferred aspect, the forward facing wall portion of the lavatory stall unit is configured to accept loads from the passenger seat.

In another presently preferred aspect, the forward facing wall portion defines a secondary space 36 in the interior lavatory space in an area 38 forward of an aft-most portion 40 of the forward facing wall portion, and the forward facing wall portion includes a forward projection 42 configured to project over the aft portion of the adjacent passenger seat back 44 immediately forward of the lavatory stall unit. The secondary space can include an amenity stowage space 46 inside the lavatory stall unit in the area forward of the aft-most portion of the forward facing wall portion, and the secondary space can include design elements providing visual space, such as a visual perception of space, inside the lavatory in the area forward of an aft-most portion of the forward facing wall portion. A cavity or recess 48 may also be provided approximately at floor level in the forward facing lavatory or enclosure wall to provide a volume for attachment of a lower portion of the aircraft cabin structure, such as seat legs 47, for example, to an aircraft cabin floor 49.

Figure 3:
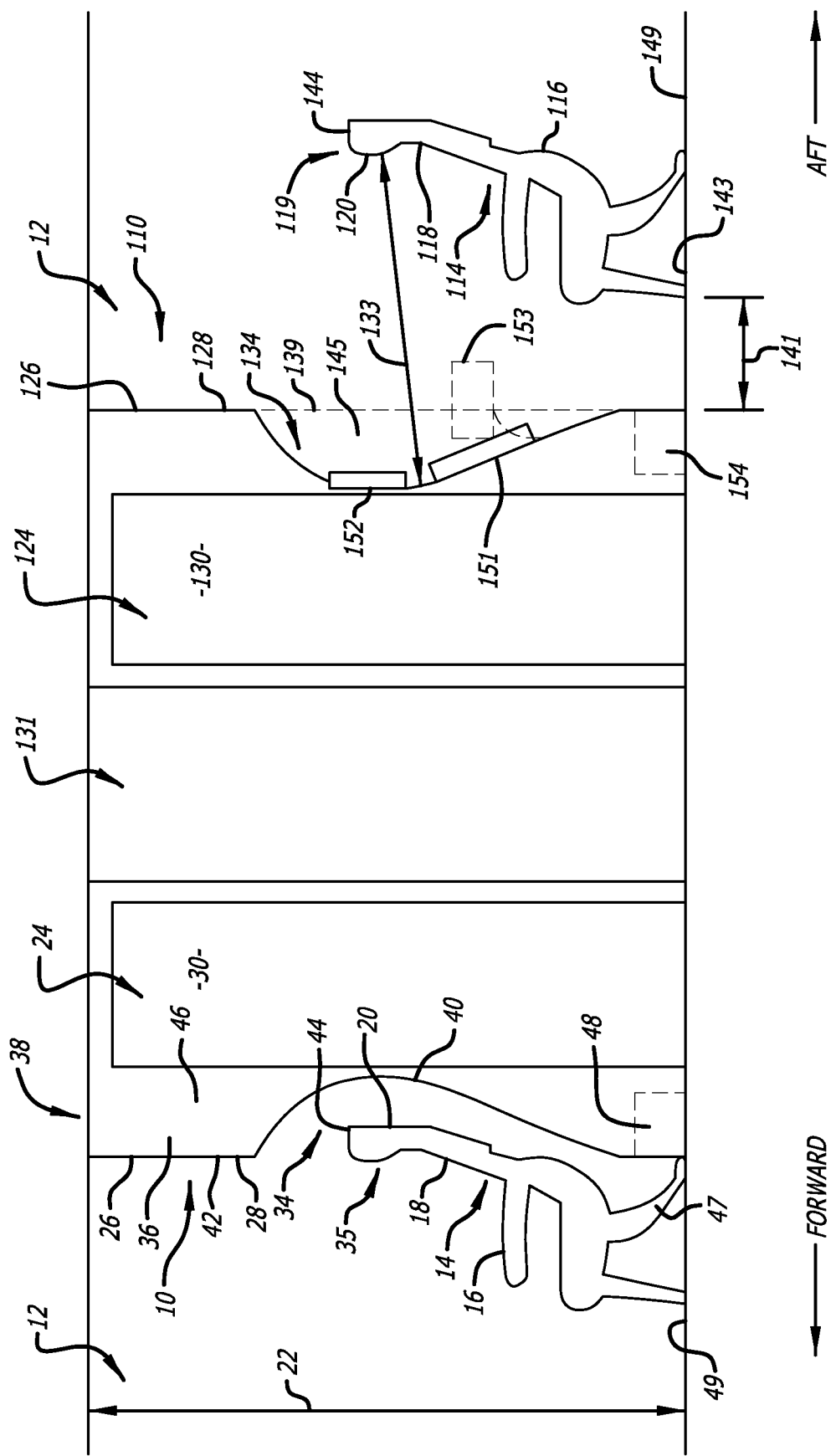
FIG. 3 is a schematic diagram of an installation of a lavatory according to a second embodiment, showing aircraft cabin passenger seat backs in an upright position.
Figure 4:
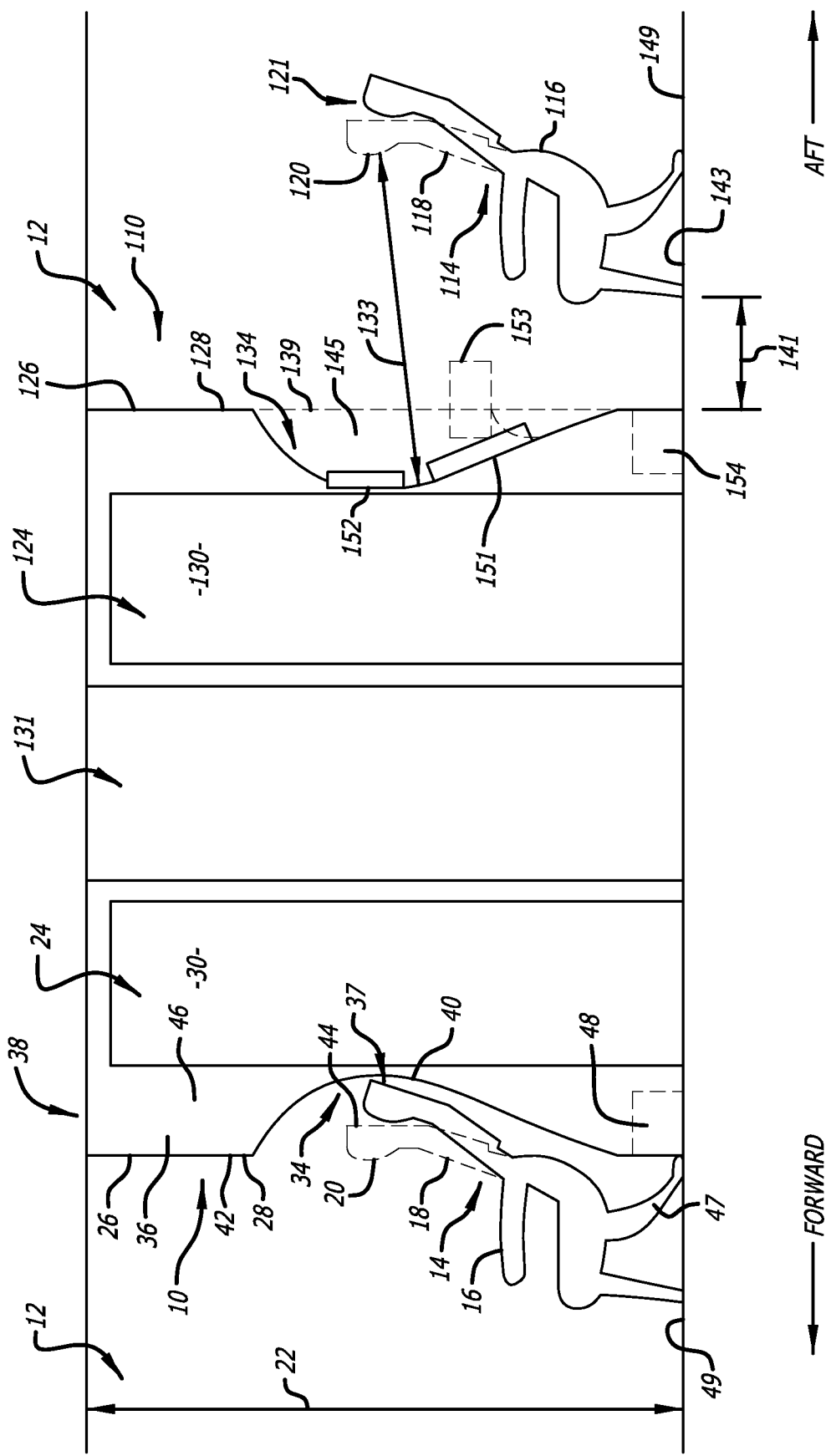
FIG. 4 is a schematic diagram of the installation of a lavatory according to a second embodiment similar to FIG. 3, showing aircraft cabin passenger seat backs in a reclined position.

Referring to FIGS. 3 and 4, in a second embodiment, the present invention also provides for an enclosure 110, such as a lavatory, for example, in a cabin 12 of an aircraft, although the enclosure may also be an aircraft closet, or an aircraft galley, or another similar enclosed or structurally defined space, for example. The cabin includes an aircraft cabin structure 114, such as a passenger seat 116, for example, installed immediately aft of the enclosure and having an upper aft portion 118, such as a seat back 144, for example, movable from an upright position 119, illustrated in FIG. 3, to a reclined position 121, illustrated in FIG. 4. The upper aft portion of the passenger seat typically includes an upper, forward facing portion 120, against which a passenger's head would typically rest.

The lavatory includes a lavatory stall unit 124 and is enclosed by one or more walls 126 having an aft facing wall portion 128. The one or more walls define an interior lavatory space 130, and the aft facing wall portion is configured to be disposed forward of and adjacent to the aircraft cabin structure, such as a passenger seat, as would typically occur aft of an aircraft doorway or cross aisle 131. The enclosure is typically taller than the cabin structure or passenger seat, and the aft facing wall portion preferably is shaped to include a concave recess 134, so that the aft facing wall portion is substantially not flat in the vertical plane, and the concave recess is preferably spaced apart a distance 133 from the upper, forward facing portion of the aircraft cabin structure, where a passenger's head would typically rest, to the aft facing wall portion of the lavatory or enclosure, sufficient to avoid having a passenger's head impact the aft facing lavatory or enclosure wall in a sudden aircraft deceleration, and this distance is preferably a greater distance from the upper, forward facing portion of the aircraft cabin structure to the aft facing lavatory or enclosure wall than with a flat wall 139 (shown in dotted lines in FIGS. 3 and 4) of the prior art. As a consequence, a distance 141 that is commonly required between a base 143 of the aircraft cabin structure or passenger seat and the lavatory or enclosure can be made smaller, making space available for other purposes in the airplane.

In another presently preferred aspect, the volume 145 in the aft facing concave recess in the aft facing wall portion is sufficient for the mounting of a protective or "delethalizing" cushion 151, such as an airbag, or an energy absorbing cushion, for example, to the aft facing concave recess in the aft facing wall portion, in order to reduce a passenger's risk of head trauma resulting from the passenger's head contacting the aft facing lavatory or enclosure wall in a sudden deceleration of the aircraft. The volume in the aft facing concave recess in the aft facing wall portion is also preferably sufficient for the mounting of a video monitor 152 in the aft facing concave recess in the lavatory or enclosure wall that does not inhibit passenger movement, as well as for the mounting of a bassinet or infant bed 153 that does not obstruct passenger movement as much as bassinets or infant beds mounted on the flat walls for use during flight and extending in a vertical plane of the prior art. In addition, at floor level or adjacent to the cabin floor 149, the aft facing wall portion may also include one or more cavities 154 configured to provide supplemental foot clearance for passengers.

It will be apparent from the foregoing that while particular forms of the invention have been illustrated and described, various modifications can be made without departing from the spirit and scope of the invention. Accordingly, it is not intended that the invention be limited, except as by the appended claims.

We claim:

1. A partition for installation in an aircraft cabin, the partition being substantially not flat in a vertical plane extending laterally from an aisle of the aircraft cabin, the partition comprising:
    an upper wall portion defining a first wall surface that is rearward of the vertical plane and extends laterally along a first axis perpendicular to the vertical plane;
    a mid-wall portion extending from the upper wall portion and defining a second wall surface that is forward of the vertical plane and extends laterally along a second axis parallel to the first axis; and
    a lower wall portion extending from the mid-wall portion and defining a third wall surface that is rearward of the vertical plane and the first wall surface and extends laterally along a third axis parallel to the first axis, wherein the upper wall portion, the mid-wall portion and the lower wall portion combine to define a recess disposed between the upper wall portion and the lower wall portion, wherein
        the recess is configured to provide clearance for a head of a passenger seated in a rear-positioned passenger seat and facing the partition in a sudden aircraft deceleration, and
        the partition provides additional space for the rear-positioned passenger seat to be positioned further forward in the aircraft cabin when compared with a position of the rear-positioned passenger seat if the partition was instead flat.

2. The partition of claim 1, wherein the recess includes a protective cushion.

3. The partition of claim 1, wherein the recess is formed within a range from a position taller than the rear-positioned passenger seat to a position at or taller than a seat bottom of the rear-positioned passenger seat.

4. The partition of claim 1, wherein a depth of the recess is largest at a position opposing to an upper, forward facing portion of the passenger seat, against which a passenger's head rests.

5. The partition of claim 1, wherein the partition defines an aft facing wall portion of an aircraft enclosure for the aircraft cabin.

6. The partition of claim 5, wherein the aircraft enclosure is a lavatory.

7. The partition of claim 1, further comprising a second forward-extending recess proximate to a lower end of the lower wall portion, the second forward-extending recess being configured to receive feet of the passenger seated in the rear-positioned passenger seat.

8. The partition of claim 1, wherein a depth of the recess is largest at a position opposing to an upper, forward facing portion of the rear-positioned passenger seat, against which the head of the passenger rests.

9. The partition of claim 1, wherein the partition defines an aft facing wall portion of an aircraft enclosure for the aircraft cabin.

10. The partition of claim 9, wherein the aircraft enclosure is a lavatory monument.

11. An assembly for an aircraft cabin, the assembly comprising:
    a passenger seat; and
    a partition comprising
        an upper wall portion having a first surface facing the passenger seat and forward from the passenger seat, the first surface rearward of a vertical plane extending laterally from an aisle of the aircraft cabin, the first surface extending laterally along a first axis perpendicular to the vertical plane;
        a mid-wall portion having a second surface facing the passenger seat and forward from the first surface, the second surface extending laterally along a second axis parallel to the first axis, and
        an aft-extending lower wall portion having a third surface facing the passenger seat and aft from the second surface, the third surface extending laterally along a third axis parallel to the first axis, wherein the upper wall portion, the mid-wall portion and the lower wall portion combine to define a recess disposed between the upper wall portion and the lower wall portion;
    wherein the passenger is seat positioned aft of the partition and facing the partition;
    wherein the recess is configured to provide clearance for a head of a passenger seated in the passenger seat in a sudden aircraft deceleration; and
    wherein the partition provides additional space for the passenger seat to be positioned further forward in the aircraft cabin when compared with a position of the passenger seat if the partition was instead flat.

12. The assembly of claim 11, wherein the recess includes a video monitor.

13. The assembly of claim 11, wherein the recess is formed within a range from a position taller than the passenger seat to a position at or taller than a seat bottom of the passenger seat.

14. The assembly of claim 11, wherein a depth of the recess is largest at a position opposing to an upper, forward facing portion of the passenger seat, against which the head of the passenger rests.

15. The assembly of claim 11, wherein the partition defines an aft facing wall portion of an aircraft enclosure for the aircraft cabin.

16. The assembly of claim 15, wherein the aircraft enclosure is lavatory monument.

17. The assembly of claim 11, wherein the lower wall portion is positioned above a lower recess adjacent to a floor of the aircraft cabin, wherein the lower recess is configured to provide foot clearance for the passenger seated in the passenger seat.

18. The assembly of claim 11, wherein the passenger seat has a seat back movable from an upright position to a reclined position.

19. The assembly of claim 11, wherein the recess includes a bassinet.

* * * * *